United States Patent
Yan et al.

(10) Patent No.: US 10,808,761 B2
(45) Date of Patent: Oct. 20, 2020

(54) ROLLING BEARING, AND ABRASION RESISTANCE TREATMENT METHOD FOR BEARING RACEWAY SURFACE

(71) Applicant: NTN CORPORATION, Osaka (JP)

(72) Inventors: Weida Yan, Kuwana (JP); Kazumasa Seko, Kuwana (JP); Michio Hori, Kuwana (JP); Takashi Yamamoto, Kuwana (JP); Naoya Hasegawa, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/087,328

(22) PCT Filed: Mar. 22, 2017

(86) PCT No.: PCT/JP2017/011542
§ 371 (c)(1),
(2) Date: Sep. 21, 2018

(87) PCT Pub. No.: WO2017/164256
PCT Pub. Date: Sep. 28, 2017

(65) Prior Publication Data
US 2019/0113078 A1 Apr. 18, 2019

(30) Foreign Application Priority Data
Mar. 24, 2016 (JP) .................. 2016-059475

(51) Int. Cl.
*F16C 33/62* (2006.01)
*F16C 33/64* (2006.01)
(Continued)

(52) U.S. Cl.
CPC .............. *F16C 33/62* (2013.01); *F16C 33/64* (2013.01); *F16C 19/06* (2013.01); *F16C 19/26* (2013.01);
(Continued)

(58) Field of Classification Search
CPC ........ F16C 33/585; F16C 33/62; F16C 33/64; F16C 19/38; F16C 23/08; F16C 23/086;
(Continued)

(56) References Cited

U.S. PATENT DOCUMENTS 6,478,893 B1 * 11/2002 Takemura ................ C21D 7/06
148/320
7,918,649 B2 4/2011 Nakagawa et al.
(Continued)

FOREIGN PATENT DOCUMENTS

| CN | 101641225 | 2/2010 |
|---|---|---|
| CN | 103797258 | 5/2014 |

(Continued)

OTHER PUBLICATIONS

Chinese Office Action dated Jul. 31, 2019 in corresponding Chinese Patent Application No. 201780019184.8.
(Continued)

*Primary Examiner* — Alan B Waits

(57) ABSTRACT

A rolling bearing includes an inner ring, an outer ring, and rolling elements interposed between the inner ring and the outer ring. A surface layer portion, beneath a raceway surface (10a), of a base material of a raceway ring (10) which is the inner ring or the outer ring, is a wear-resistant layer (13) which has a higher hardness than a residual portion (12), beneath the surface layer portion, of the base material, and includes a minute-recess-and-projection surface. An oxide film (14) is provided which has such a film thickness (t) as to fill recesses of the minute-recess-and-projection surface of the wear-resistant layer (13), and includes recesses and projections existing along the minute-recess-and-projection surface, and the oxide film (14) coats the surface of the wear-resistant layer (13). The oxide film
(Continued)

(14) is made from a material more fragile than the wear-resistant layer (13) of the base material.

6 Claims, 3 Drawing Sheets

(51) Int. Cl.
*F16C 19/26* (2006.01)
*F16C 19/06* (2006.01)
*F16C 19/36* (2006.01)
*F16C 23/08* (2006.01)

(52) U.S. Cl.
CPC .......... *F16C 19/362* (2013.01); *F16C 23/086* (2013.01); *F16C 2223/08* (2013.01); *F16C 2300/14* (2013.01); *F16C 2360/31* (2013.01)

(58) Field of Classification Search
CPC ........ F16C 19/26; F16C 19/362; F16C 19/06; F16C 2300/14; F16C 2360/31; F16C 23/082; F16C 23/084; F16C 2223/08
See application file for complete search history.

(56) References Cited

U.S. PATENT DOCUMENTS

| | | |
|---|---|---|
| 8,757,887 B2 | 6/2014 | Torii et al. |
| 9,039,286 B2 | 5/2015 | Torii et al. |
| 9,321,309 B2 | 4/2016 | Torii et al. |
| 2003/0165279 A1* | 9/2003 | Hirai ..................... B32B 15/015 384/492 |
| 2003/0181287 A1 | 9/2003 | Itoh et al. |
| 2007/0092171 A1* | 4/2007 | Asada .................. F16C 17/026 384/107 |
| 2007/0127858 A1 | 6/2007 | Nakagawa et al. |
| 2010/0215302 A1 | 8/2010 | Torii et al. |
| 2010/0316318 A1* | 12/2010 | Hewitt ................ F16C 33/7886 384/477 |
| 2012/0121420 A1* | 5/2012 | Yuki ........................ C21D 1/10 416/174 |
| 2014/0239707 A1 | 8/2014 | Torii et al. |
| 2014/0270616 A1* | 9/2014 | Umemoto ............. F16C 35/067 384/569 |
| 2015/0197121 A1 | 7/2015 | Torii et al. |
| 2016/0178001 A1* | 6/2016 | Bjorkman ................ C21D 9/40 416/174 |

FOREIGN PATENT DOCUMENTS

| | | |
|---|---|---|
| CN | 204239457 | 4/2015 |
| EP | 2 743 528 A1 | 6/2014 |
| EP | 2 754 903 A1 | 7/2014 |
| JP | 5-180231 | 7/1993 |
| JP | 6-229423 | 8/1994 |
| JP | 10-176718 | 6/1998 |
| JP | 2012-52610 | 3/2012 |
| JP | 2012-167685 | 9/2012 |
| JP | 2013-36596 | 2/2013 |
| JP | 2014-196758 | 10/2014 |
| WO | WO 2005/050038 A1 | 6/2005 |

OTHER PUBLICATIONS

Extended European Search Report dated Sep. 4, 2019 in corresponding European Patent Application No. 17770296.6.
Taguchi et al., "Effect of Naturally Derived Antioxidants as Surface Treatment". NTN Technical Review No. 81 (Nov. 2013), pp. 85-91†.
International Search Report dated Jun. 20, 2017 in corresponding International Patent Application No. PCT/JP2017/011542.
English Translation by WIPO of the International Preliminary Report on Patentability dated Oct. 4, 2018 in corresponding International Patent Application No. PCT/JP2017/011542, 9 pgs.
Notice of Reasons for Refusal, dated Nov. 26, 2019, in Japanese Patent Application No. 2016-059475 (8 pp.).
Notice of Reasons for Refusal, dated Jun. 9, 2020, in corresponding Japanese Application No. 2016-059475 (6 pp.).

\* cited by examiner

ROLLING BEARING, AND ABRASION RESISTANCE TREATMENT METHOD FOR BEARING RACEWAY SURFACE

CROSS REFERENCE TO THE RELATED APPLICATION

This application is a National Phase Application under 35 U.S.C. § 371 of PCT International Patent Application No. PCT/JP2017/011542, filed Mar. 22, 2017, which claims Convention priority to Japanese patent application No. 2016-059475, filed Mar. 24, 2016, the entire disclosure of which is herein incorporated by reference as a part of this application.

BACKGROUND OF THE INVENTION

Field of the Invention

The present invention relates to: a rolling bearing such as a double-row self-aligning roller bearing for supporting a main shaft of a wind power generator or an industrial machine; and a wear resistance treatment method for a raceway surface of such a bearing.

Description of Related Art

As a bearing for supporting a main shaft of a wind power generator, a double-row self-aligning roller bearing has been widely used (for example, Patent Document 1). In addition to a radial load due to the weights of each blade and a rotor head, an axial load due to wind force acts on a bearing for supporting a main shaft of a wind power generator. When an axial load acts, rollers on a row that receives the axial load among the double row rollers of such a double-row self-aligning roller bearing, are subjected to a radial load and the axial load at the same time. Since the axial load in a single direction is higher than the radial load, surface damage such as wear may occur on a roller row subjected to the axial load at a raceway surface of a raceway ring.

The wear of the bearing is attributed mainly to the following two causes.

(1) One of the causes is a usage condition. Wear may occur in a case where, for example: the bearing is used at low speed under high load; low-viscosity oil, is used in order to improve efficiency; or a small-size bearing is used for size reduction.

(2) The other cause of the wear is a slip between the raceway surface and rolling elements. In particular, in the double-row self-aligning roller bearing, each roller has a spherical surface and undergoes differential slip, and thus, wear may be apt to occur.

In order to increase the wear resistance of the raceway surface of the raceway ring, shot peening treatment has been performed to harden the raceway surface. The surface roughness is fairly large with only the shot peening treatment. Thus, a finishing treatment such as polishing has been performed after the shot peening treatment.

In addition, as the surface treatment for the raceway surface of the bearing, it has been suggested to form an oxide film on the raceway surface with use of a plant-derived chlorogenic acid (Non-Patent Document 1). The document describes that wear characteristics, a lifespan until seizing occurs, rust-proof property and the like are improved by performing the surface treatment using the chlorogenic acid.

RELATED DOCUMENT

Patent Document

[Patent Document 1] WO 2005/050038
[Non-Patent Document 1] Yosuke TAGUCHI, Eriko ITAHASHI, and Hidenobu MIKAMI, "Effect of Naturally Derived Antioxidants as Surface Treatment", NTN TECHNICAL REVIEW No. 81 (2013)

For example, in a case where a double-row self-aligning roller bearing is used for supporting a main shaft of a wind power generator, a large-size bearing may be used in order to elongate the lifespan of the bearing by increasing the load capacity of a roller row to be subjected to an axial load. However, such a large-size bearing causes increase in the weight thereof and increase in the cost therefor.

In a case where surface treatment is performed in order to increase the wear resistance of a raceway surface, as in the conventional case described above, performing the finishing treatment after performing the shot peening treatment means that two steps are required for the surface treatment of the raceway surface, and thus, manufacturing efficiency is low and cost increase results.

SUMMARY OF THE INVENTION

One object of the present invention is to provide a rolling bearing which is suitable particularly for being used at low speed under high load to similarly to, for example, a bearing for supporting a main shaft of a wind power generator, the rolling bearing enabling reduction in wear of a raceway surface of a raceway ring thereof and allowing surface treatment of the raceway surface to be easily performed. Another object of the present invention is to provide a wear resistance treatment method for a bearing raceway surface, the wear resistance treatment method enabling reduction in the wear of the raceway surface of the raceway ring and allowing the surface treatment of the raceway surface to be easily performed.

A rolling bearing according to the present invention includes: an inner ring; an outer ring; and rolling elements interposed between the inner ring and the outer ring. A surface layer portion, beneath a raceway surface, of a base material of a raceway ring which is the inner ring or the outer ring, includes a wear-resistant layer having a higher hardness than a residual portion or general portion, beneath the surface layer portion, of the base material, the wear-resistant layer having a surface which is a minute-recess-and-projection surface. An oxide film is provided which has such a film thickness as to fill recesses of the minute-recess-and-projection surface of the wear-resistant layer, the oxide film having a surface which has recesses and projections existing along the minute-recess-and-projection surface, the oxide film coating the surface of the wear-resistant layer. The oxide film is made from a material more fragile than the wear-resistant layer of the base material.

In this configuration, the raceway surface of the raceway ring in a state before usage has the wear-resistant layer at the surface layer portion, and the surface of the wear-resistant layer is coated with the oxide film. The surface of the wear-resistant layer is the minute-recess-and-projection surface, and the surface of the oxide film has a recessed and projecting shape along the minute-recess-and-projection surface of the wear-resistant layer. The surface of the oxide film is made from a material more fragile than the wear-resistant layer and the residual portion of the base material which are beneath the oxide film. Therefore, when operation of the rolling bearing is started, the projections of the oxide film are easily worn owing to rotational contact between the raceway ring and the rolling elements, and thus, the oxide film is smoothed. In this manner, by the operation of the rolling bearing, the raceway surface is naturally flattened to be smoothed, and thus, no finishing treatment such as polishing is needed. Since the process of forming the oxide film is easier than the finishing treatment such as polishing, the raceway ring can be efficiently manufactured at low cost.

Since the rolling bearing having this configuration has the wear-resistant layer at the surface layer portion beneath the raceway surface, wear of the raceway ring is reduced, whereby elongation of the lifespan of the rolling bearing can be achieved. Furthermore, in a state where the raceway surface of the raceway ring is flattened owing to usage, the raceway surface is smoothed, and the rotational resistance of the bearing is lower than that of a bearing obtained through only shot peening treatment.

The rolling bearing may be a double-row self-aligning roller bearing in which rollers are interposed in two rows between an inner ring and an outer ring and the raceway surface of the outer ring has a spherical shape. In the double-row self-aligning roller bearing, wear due to differential slip is apt to occur, and thus, it is effective to provide the wear-resistant layer to the raceway surface of the raceway ring so as to harden the raceway surface.

A wear resistance treatment method for a bearing raceway surface according to the present invention is applied to a raceway surface of a raceway ring which is an inner ring or an outer ring of a rolling bearing having rolling elements interposed between the inner ring and the outer ring. The wear resistance treatment method includes: a step of performing shot peening treatment on the raceway surface thereby to form a wear-resistant layer at a surface layer portion, beneath the raceway surface, of a base material of the raceway ring, the wear-resistant layer being formed so as to have residual stress and have a higher hardness than a residual portion or general portion, beneath the surface layer portion, of the base material and so as to have a surface which is a minute-recess-and-projection surface; and a step of oxidizing the surface of the wear-resistant layer thereby to form an oxide film so as to have a film thickness not smaller than depths of recesses of the minute-recess-and-projection surface of the wear-resistant layer, the oxide film having recesses and projections existing along the minute-recess-and-projection surface, the recesses and the projections of a surface of the oxide film being smoothed by coming into rotational contact with the rolling elements at a time of operation.

When surface treatment is performed on the raceway surface of the raceway ring by this wear resistance treatment method, the raceway surface of the raceway ring in a state before usage has the wear-resistant layer at the surface layer portion, and the surface of the wear-resistant layer is coated with the oxide film. The surface of the wear-resistant layer is the minute-recess-and-projection surface, and the surface of the oxide film has a recessed and projecting shape along the minute-recess-and-projection surface of the wear-resistant layer. The surface of the oxide film is made from a material more fragile than the wear-resistant layer and the residual portion of the base material which are beneath the oxide film. Therefore, when operation of the rolling bearing is started, the projections of the oxide film are easily worn owing to rotational contact between the raceway ring and the rolling elements, and thus, the oxide film is smoothed. In this manner, by the operation of the rolling bearing, the raceway surface is naturally flattened to be smoothed, and thus, no finishing treatment such as polishing is needed. Since the process of forming the oxide film is easier than the finishing treatment such as polishing, the raceway ring can be efficiently manufactured at low cost.

The formation of the oxide film may be performed through a surface treatment using chlorogenic acid or a black oxide treatment. In either of the treatments, treatment can be performed with a simple method in which the raceway ring is merely soaked in a treatment liquid. In particular, since the chlorogenic acid is made from a plant-derived component, the surface treatment using the chlorogenic acid is environmentally friendly.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
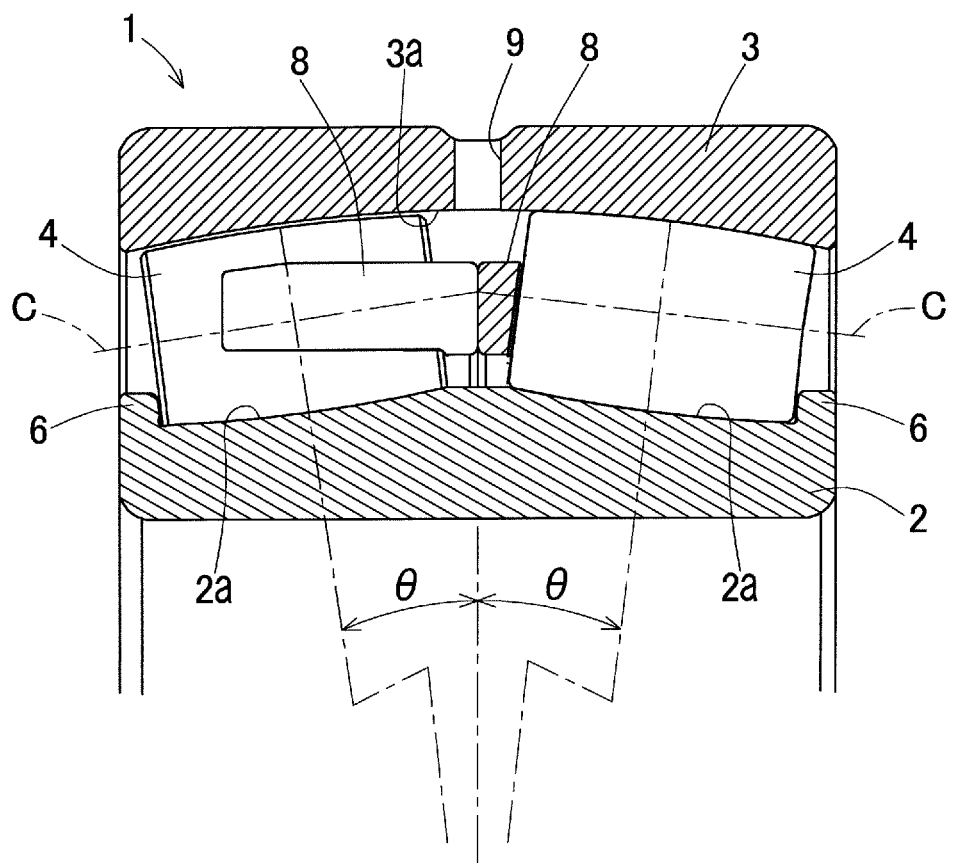
FIG. 1 is a vertical cross-sectional view of a rolling bearing according to a first embodiment of the present invention.

A first embodiment of the present invention will be described with reference to the drawings. This rolling bearing 1 is a double-row self-aligning roller bearing in which rollers 4 forming rolling elements are interposed in two rows, i.e., left and right rows arranged in the width direction, between an inner ring 2 and an outer ring 3 which are raceway rings. The inner ring 2, the outer ring 3, and the rollers 4 are each made from bearing steel. A raceway surface 3a of the outer ring 3 has a spherical shape. Each of the rollers 4 in the left and right rows has an outer peripheral surface having a cross-sectional shape along the raceway surface 3a of the outer ring 3. In other words, the outer peripheral surface of the roller 4 is a rotation curved surface obtained by rotating, around a center line C of the roller 4, a circular arc extending along the raceway surface 3a of the outer ring 3. Double row raceway surfaces 2a are formed on the inner ring 2 so as to have cross-sectional shapes along the outer peripheral surfaces of the rollers 4 in the respective left and right rows.

In the example in the drawing, the shapes of the rollers 4 are the same between the left and right rows. That is, between the left and right rows, the lengths, along the center line C, of the rollers 4 are the same, and the contact angles θ of the rollers 4 are the same. Each of the rollers 4 in the left and right rows is a symmetrical roller in which the position of the maximum diameter thereof is located at the center of the roller length. The shapes of the rollers 4 may be different between the left and right rows. The position of the maximum diameter of each roller may be displaced from the center thereof in the roller length direction.

Flanges 6 are provided at respective opposed ends of the outer peripheral surface of the inner ring 2. In the example in the drawing, no intermediate flange exists at a center portion of the outer peripheral surface of the inner ring 2, i.e., a portion between the rollers 4, 4 in the left and right rows. At the portion between the rollers 4, 4 in the left and right rows, an intermediate flange may be provided or a guide ring may be interposed. The rollers 4, 4 in the left and right rows are retained by a retainer 8. A grease supply port 9 is provided at a center portion, in the axial direction, of the outer ring 3.

Figure 2A:
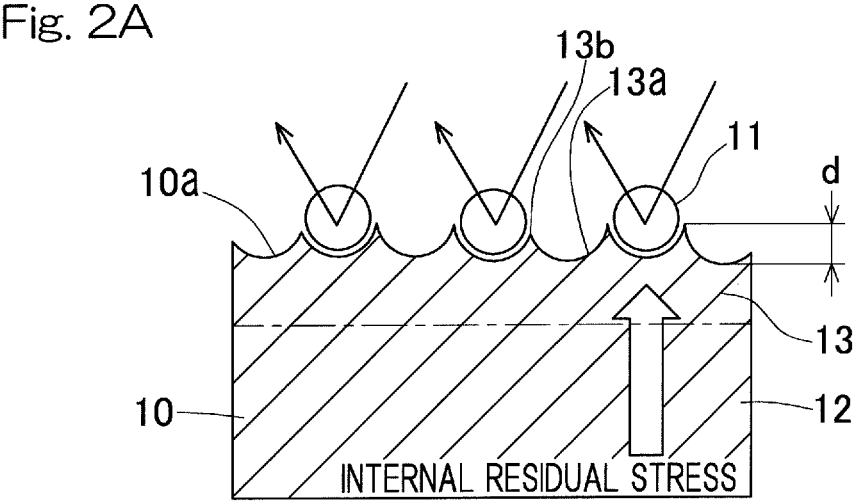
FIG. 2A is an explanatory view showing a first step for performing wear resistance treatment on a raceway surface of a raceway ring.
Figure 2B:
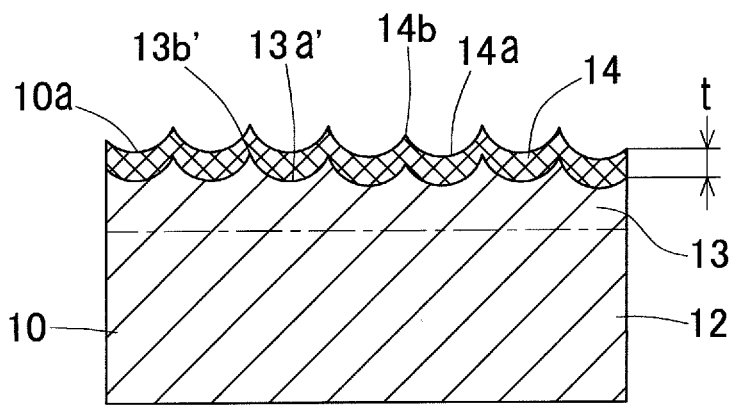
FIG. 2B is an explanatory view showing a second step for performing the wear resistance treatment on the raceway surface of the raceway ring.
Figure 2C:
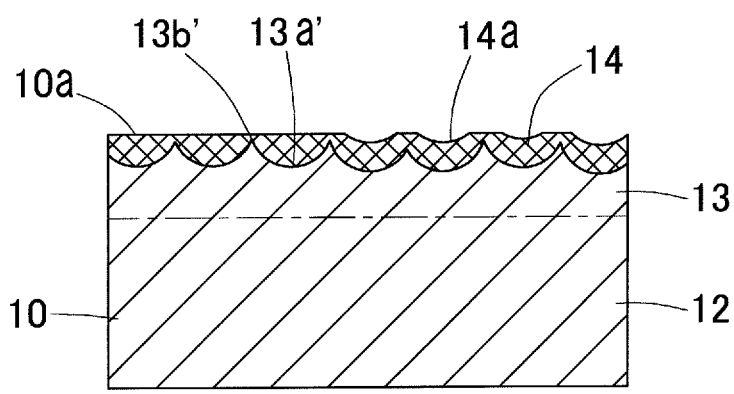
FIG. 2C is an explanatory view showing a third step of flattening the raceway surface.

Wear resistance treatment is performed on the raceway surfaces 2a, 3a of the inner ring 2 and the outer ring 3. FIGS. 2A to 2C are explanatory views showing steps of the wear resistance treatment.

As shown in FIG. 2A, in a first step of the wear resistance treatment, shot peening treatment is performed on a raceway surface 10a of a raceway ring 10 which is the inner ring or the outer ring. By the shot peening treatment, shots 11 which include an infinite number of round balls made from iron or a metal other than iron are caused to collide with the raceway surface 10a at high speed, thereby providing internal residual stress to a surface layer portion of the raceway surface 10a. The surface layer portion to which the internal residual stress has been provided, forms a wear-resistant layer 13 having a higher hardness than a residual portion or general portion 12, beneath the surface layer portion, of a base material. The surface of the wear-resistant layer 13 is a minute-recess-and-projection surface formed as a result of: portions, with which the shots 11 have collided, becoming recesses 13a; and portions, with which no shots 11 have collided, remaining as projections 13b. A surface roughness after the shot peening treatment is equal to or greater than 0.3 Ra, for example.

As shown in FIG. 2B, in a second step, the surface of the wear-resistant layer 13 is oxidized such that an oxide film 14 of triiron tetraoxide $Fe_3O_4$ is formed. By the surface portion of the wear-resistant layer 13 being transformed into the oxide film 14, recesses 13a' and projections 13b' of the wear-resistant layer 13 are newly formed on the back side of the oxide film 14. The surface of the oxide film 14 is a minute-recess-and-projection surface at which recesses 14a and projections 14b are arranged similarly to the surface of the wear-resistant layer 13 obtained at the end of the first step. A film thickness t of the oxide film 14 is equal to or slightly larger than a depth d of each recess 13a of the wear-resistant layer 13 obtained at the end of the first step. The film thickness t is approximately 0.5 to 2 μm, for example. The formation of the oxide film 14 is performed through a surface treatment using chlorogenic acid, or a black oxide treatment.

When operation of the rolling bearing obtained by performing the wear resistance treatment on the raceway surface 10a of the raceway ring 10 as described above is started, the raceway ring 10 and the rolling elements (not shown) come into rotational contact with each other, and thus, the projections 14b of the oxide film 14 are worn, whereby the surface of the oxide film 14 is smoothed as in a third step shown in FIG. 2C.

In this manner, by the operation of the rolling bearing, the raceway surface 10a of the raceway ring 10 is naturally flattened such that the raceway surface 10a is smoothed, and thus, no finishing treatment such as polishing as in a conventional case is required. The surface treatment using chlorogenic acid or the black oxide treatment for forming the oxide film 14 are each a simple method in which the raceway ring 10 is merely soaked in a treatment liquid, and thus, are each easier than the finishing treatment such as polishing. Accordingly, the raceway ring 10 can be efficiently manufactured at low cost. In addition, in the case of the surface treatment using chlorogenic acid, a plant-derived chlorogenic acid is used, and thus, the surface treatment is environmentally friendly.

When the wear resistance treatment for a bearing raceway ring is performed on the raceway ring of the rolling bearing, wear of the raceway ring 10 is reduced, whereby elongation of the lifespan of the rolling bearing can be achieved. In particular, the wear resistance treatment is effective when being performed on a double-row self-aligning roller bearing in which wear due to differential slip is apt to occur. However, the wear resistance treatment for the bearing raceway ring may be performed on a rolling bearing other than the double-row self-aligning roller bearing. Even in this case, the wear of the raceway ring 10 is reduced, whereby elongation of the lifespan of the rolling bearing can be achieved.

Figure 3:
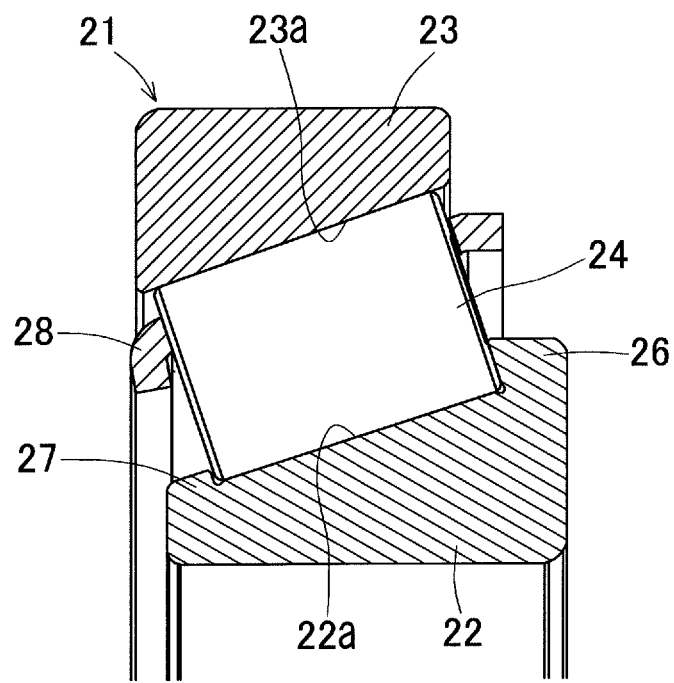
FIG. 3 is a vertical cross-sectional view of a rolling bearing according to a second embodiment of the present invention.

FIG. 3 shows an example where the present invention is implemented as a rolling bearing 21 which is a tapered roller bearing. The wear resistance treatment is performed on raceway surfaces 22a, 23a of an inner ring 22 and an outer ring 23 which are raceway rings. Rolling elements are tapered rollers 24. A large flange 26 and a small flange 27 are provided at opposed ends of the outer peripheral surface of the inner ring 22. Each tapered roller 24 is retained by a retainer 28.

Figure 4:
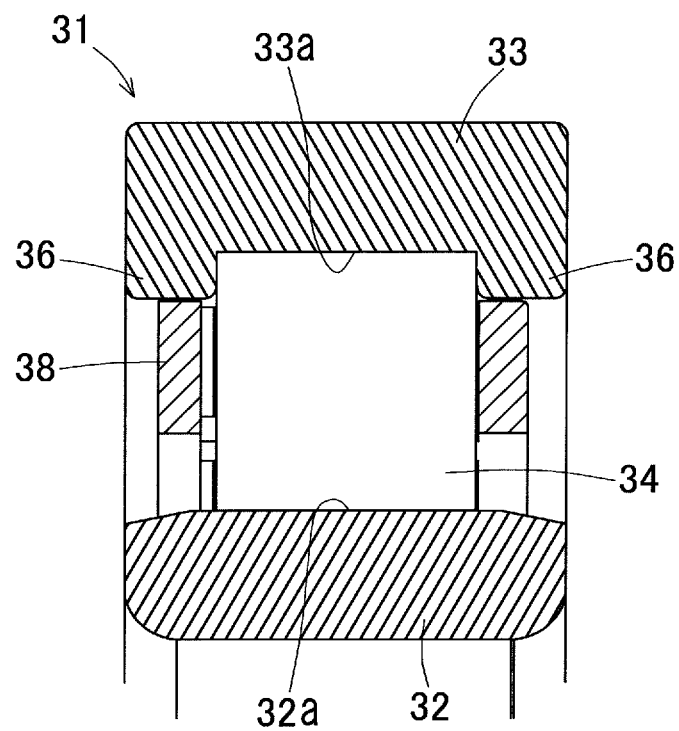
FIG. 4 is a vertical cross-sectional view of a rolling bearing according to a third embodiment of the present invention.

FIG. 4 shows an example where the present invention is implemented as a rolling bearing 31 which is a cylindrical roller bearing. The wear resistance treatment is performed on raceway surfaces 32a, 33a of an inner ring 32 and an outer ring 33 which are raceway rings. Rolling elements are cylindrical rollers 34. Flanges 36 are provided at opposed ends of the inner peripheral surface of the outer ring 33. Each cylindrical roller 34 is retained by a retainer 38.

Figure 5:
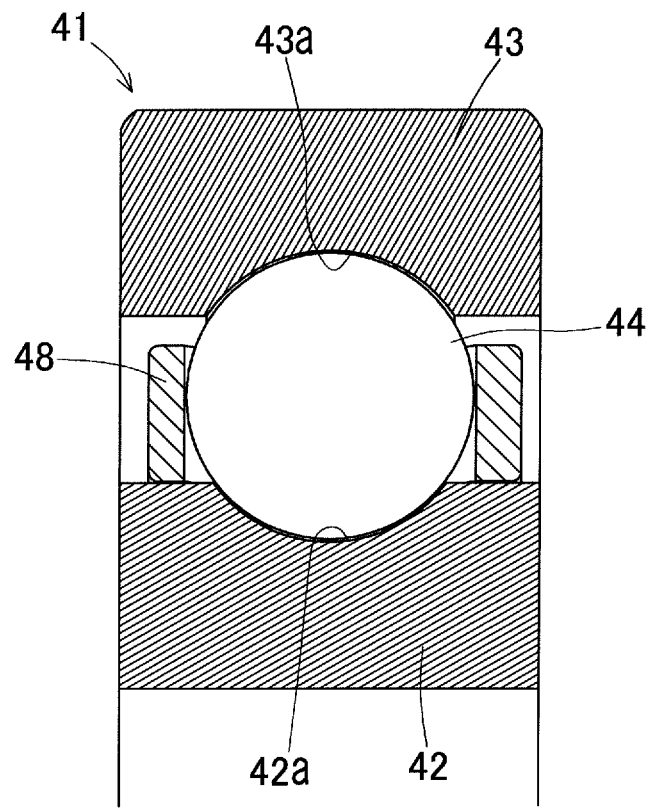
FIG. 5 is a vertical cross-sectional view of a rolling bearing according to a fourth embodiment of the present invention.

FIG. 5 shows an example where the present invention is implemented as a rolling bearing 41 which is a deep-groove ball bearing. The wear resistance treatment is performed on raceway surfaces 42a, 43a of an inner ring 42 and an outer ring 43 which are raceway rings. Rolling elements are balls 44. Each ball 44 is retained by a retainer 48.

Although the modes for carrying out the present invention have been described above on the basis of the embodiments, the embodiments disclosed herein are, in all aspects, illustrative and not restrictive. The scope of the present invention is indicated by claims, not by the above description, and is intended to include any modifications within the scope and meaning equivalent to the claims.

REFERENCE NUMERALS 1, 21, 31, 41 . . . rolling bearing
2, 22, 32, 42 . . . inner ring (raceway ring)
2a, 22a, 32a, 42a . . . raceway surface
3, 23, 33, 43 . . . outer ring (raceway ring)
3a, 23a, 33a, 43a . . . raceway surface
4 . . . roller (rolling element)
10 . . . raceway ring
10a . . . raceway surface
13 . . . wear-resistant layer
13a, 13a' . . . recess
13b, 13b' . . . projection
14 . . . oxide film
14a . . . recess
14b . . . projection
24 . . . tapered roller (rolling element)
34 . . . cylindrical roller (rolling element)
44 . . . ball (rolling element)

What is claimed is:

1. A rolling bearing comprising:
an inner ring;
an outer ring; and
rolling elements interposed between the inner ring and the outer ring, wherein
a surface layer portion, beneath a raceway surface, of a base material of a raceway ring which is the inner ring or the outer ring, includes a wear-resistant layer having a higher hardness than a residual portion, beneath the surface layer portion, of the base material, the wear-resistant layer having a surface which is a minute-recess-and-projection surface and having a roughness Ra of 0.3 μm or greater,
an oxide film is provided which has such a film thickness as to fill recesses of the minute-recess-and-projection surface of the wear-resistant layer, the oxide film having a bottom surface which has recesses and projections existing along the minute-recess-and-projection surface, the oxide film coating the surface of the wear-resistant layer, and
the oxide film is made from a material more fragile than the wear-resistant layer of the base material.

2. The rolling bearing as claimed in claim 1, the rolling bearing being a double-row self-aligning roller bearing in which rollers forming the rolling elements are interposed in two rows between an inner ring and an outer ring and the raceway surface of the outer ring has a spherical shape.

3. The rolling bearing as claimed in claim 1, wherein the oxide film coating the surface of the wear-resistant layer of the surface layer portion of the raceway ring is the outermost surface of the rolling bearing.

4. A wear resistance treatment method for a raceway surface of a raceway ring which is an inner ring or an outer ring of a rolling bearing having rolling elements interposed between the inner ring and the outer ring, the wear resistance treatment method comprising:
performing shot peening treatment on the raceway surface thereby to form a wear-resistant layer at a surface layer portion, beneath the raceway surface, of a base material of the raceway ring, the wear-resistant layer being formed so as to have residual stress and have a higher hardness than a residual portion, beneath the surface layer portion, of the base material and so as to have a surface which is a minute-recess-and-projection surface and to have a roughness Ra of 0.3 μm or greater; and
oxidizing the surface of the wear-resistant layer thereby to form an oxide film so as to have a film thickness not smaller than depths of recesses of the minute-recess-and-projection surface of the wear-resistant layer, the oxide film having a bottom surface having recesses and projections existing along the minute-recess-and-projections surface, the recesses and the projections of a top surface of the oxide film being smoothed by coming into rotational contact with the rolling elements at a time of operation.

5. The wear resistance treatment method for the bearing raceway surface as claimed in claim 4, wherein the formation of the oxide film is performed through a surface treatment using chlorogenic acid.

6. The wear resistance treatment method for the bearing raceway surface as claimed in claim 4, wherein the formation of the oxide film is performed through a black oxide treatment.

* * * * *